(12) United States Patent
Harada

(10) Patent No.: US 6,562,935 B1
(45) Date of Patent: May 13, 2003

(54) THERMOPLASTIC AROMATIC POLYSULFONE RESIN COMPOSITION

(75) Inventor: Hiroshi Harada, Minoo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/400,876

(22) Filed: Sep. 22, 1999

(30) Foreign Application Priority Data

Sep. 25, 1998 (JP) ............................................. 10-271394

(51) Int. Cl.$^7$ .......................... C08G 75/20; C08G 75/23
(52) U.S. Cl. ......................... 528/171; 528/175; 528/179
(58) Field of Search ................................. 528/170, 171, 528/174, 175

(56) References Cited

U.S. PATENT DOCUMENTS 3,230,198 A * 1/1966 Meyers
3,939,119 A * 2/1976 O'Shea
4,127,713 A * 11/1978 Campbell
4,654,410 A * 3/1987 Kashiwame

FOREIGN PATENT DOCUMENTS

| JP | 54-34335 | * | 3/1979 |
| JP | 59-191767 | * | 10/1984 |
| JP | 61-168668 | * | 7/1986 |

\* cited by examiner

Primary Examiner—David W. Wu
Assistant Examiner—R. Harlan
(74) Attorney, Agent, or Firm—Sughrue Mion, PLLC

(57) ABSTRACT

A thermoplastic aromatic polysulfone resin which is advantageous as a material for use in coating, adhesion, composite material or the like and which has a reduced viscosity (RV) of 0.36 to 0.45 dl/g and a sum total A of the number of phenolic hydroxyl groups and the number of metallic salts thereof contained in 100 repeating units of the polymer of 1.6 or more.

3 Claims, No Drawings

THERMOPLASTIC AROMATIC POLYSULFONE RESIN COMPOSITION

FIELD OF THE INVENTION

The present invention relates to thermoplastic aromatic polysulfone resins. More precisely, it relates to thermoplastic aromatic polysulfone resins which have a reduced viscosity within a specific range and have a specific sum total of the number of phenolic hydroxyl groups and the number of metallic salts thereof per a repeating unit of the polymer.

DESCRIPTION OF RELATED ART

Aromatic polysulfone resins have been used as constitutive materials for various coating substances, adhesives and composite materials, since they are not only excellent in heat resistance, flame retardation, chemical resistance and so on but also good in adhesion to materials such as metals, glass, ceramics, various resins and carbon compounds. In a utilization of the resin, for example, an organic solvent solution of the resin is applied onto a substrate, which is then subjected to heat treatment to cause molecular weight-increase i.e., further polymerization, followed by inactivation.

Among the aromatic polysulfone resin, particularly those having a phenolic hydroxyl group are applied to such use. As such thermoplastic aromatic polysulfone resins, those having a reduced viscosity (RV) and the sum total of the number of phenolic hydroxyl groups and the number of metallic salts thereof contained in 100 repeating units of the polymer of 0.41 and 0.9 (JP-A-47-1087), 0.49 and 1.02 (JP-A-50-40700), 0.16 and 12 (JP-A-52-16535), and 0.53 and 1 (JP-A-59-191767), respectively, etc, have been known.

These thermoplastic aromatic polysulfone resins, however, had problems that they require severe conditions for heat treatment, i.e. a high treatment and a long period of heating, and that matters insoluble in an organic solvent are formed which cause rough surface and insufficient adherence of coating when the organic solvent solution of the resin is applied onto a substrate.

The present inventors have conducted extensive studies for solving these problems. As the result, they have found the fact that, when a thermoplastic aromatic polysulfone resin having a specific reduced viscosity and a specific sum total of the number of phenolic hydroxyl groups and the number of metallic salts thereof per a repeating unit of the polymer is used, the molecular weight-increase and the inactivation can be attained under moderate conditions and that the formation of the insoluble matters which cause various defects can be avoided. The present invention has been completed based upon such facts.

SUMMARY OF THE INVENTION

The present invention provides a practically superior thermoplastic aromatic polysulfone resin which has a reduced viscosity (RV) of 0.36 to 0.45 dl/g and a sum total A of the number of phenolic hydroxyl groups and the number of metallic salts thereof contained in 100 repeating units of the polymer of 1.6 or more.

The thermoplastic aromatic polysulfone resin according to the present invention has a reduced viscosity (RV) of 0.36 to 0.45 dl/g.

The reduced viscosity (RV) herein refers to a value obtained by measuring a solution of a resin having a concentration of 1.0 g/100 ml in N,N-dimethylformamide with Ostwald's viscosity meter at 25° C.

When the aromatic polysulfone resin has a reduced viscosity (RV) higher than 0.45 dl/g, a gel-like material insoluble in solvents and infusible even at a high temperature is formed. This can be a cause of defects in use as a coating material, an adhesive and a composite material. When it has a reduced viscosity less than 0.36 dl/g, the effect of molecular weight-increase by heat treatment decreases and the treatment requires a higher temperature and a longer time. A reduced viscosity of 0.38 to 0.45 dl/g is preferred because the effect of molecular weight-increase by heat treatment is enhanced.

The thermoplastic aromatic polysulfone resin of the present invention has a sum total A of the number of phenolic hydroxyl groups and the number of metallic salts thereof contained in 100 repeating units of the polymer of 1.6 or more.

When the sum total is less than 1.6, the effect of molecular weight-increase by heat treatment decreases and the treatment requires a higher temperature and a longer time. Considering the molecular weight-increase effect, it is desirable that the sum total A and the reduced viscosity (RV) satisfy the following formula:

$$0.45/(RV)^{1.56} \leq A \leq 0.74/(RV)^{1.56}$$

One repeating unit of the polymer in the aromatic polysulfone resin of the present invention has one —SO$_2$— group.

Examples of the repeating unit include those represented by the following formula (1) or (2):

$$(-Ph-SO_2-Ph-O-) \tag{1}$$

$$(-Ph-SO_2-Ph-O-A-O-) \tag{2}$$

wherein Ph represents a para-phenylene group and A represents a group of the formula (3):

$$-Ph'-(-B-Ph'-)m- \tag{3}$$

wherein Ph' represents a phenylene group, B represents a direct bond, an alkylene group having 1 to 3 carbon atoms, an oxygen atom or a sulfur atom, and m represents an integer of 1 to 3.

The aromatic polysulfone resin of the present invention can be produced according to a known manner. For example, it can be produced by a condensation polymerization of a divalent phenol compound having a sulfone group and another divalent compound by using a catalyst, such as an alkali metal carbonate and an alkali metal hydrogen carbonate, in a high polar organic solvent. Examples of the divalent phenol compound having a sulfone group include dihydroxydiphenylsulfone. Examples of the other divalent compound include dihalogenobenzenoid.

When the dihalogenobenzenoid compound is used as the other divalent compound, the amount of the dihalogenobenzenoid compound is preferably within a range of 80 to 110% by mol based on the divalent phenol compound.

Examples of the highly polar organic solvent includes dimethylsulfoxide, 1-methyl-2-pyrrolidone, sulfolane(1,1-dioxothiolane), 1,3-dimethyl-2-imidazolidinone, 1,3-diethyl-2-imidazolidinone, diethylsulfone, diisopropylsulfone and diphenylsulfone.

The alkali metal carbonate and hydrogen carbonate is preferably sodium carbonate, potassium carbonate, and the corresponding hydrogen carbonates.

Generally, the alkali metal carbonate or hydrogen carbonate is used in an amount providing at least 0.95 equivalent of alkali metal atom per a phenol group and preferably an amount providing an excess of 0.001 to 0.25 equivalent of alkali metal atom per a phenol group.

The specific reduced viscosity (RV) of the aromatic polysulfone resin of the present invention, i.e. 0.36 to 0.45 dl/g, can be attained, for example, by adjusting the conditions of the condensation polymerization, such as polymerization temperature, polymerization time, the amount or kind of the catalyst to be used and the molar ratio of the divalent phenol compound having a sulfone group and the other divalent compound. Although the concrete conditions of the condensation polymerization to attain the specific reduced viscosity (RV) vary depending on the kind of monomers etc., the conditions can be easily determined, for example, by conducting a preliminary experiment.

The specific sum total A of the aromatic polysulfone resin of the present invention, i.e. 1.6 or more, can be attained, for example, by adjusting the conditions of the condensation polymerization, such as those mentioned above. Although the conditions of the condensation polymerization to attain the specific reduced viscosity (RV) vary depending on the kind of monomers etc., the conditions can be easily determined, for example, by conducting a preliminary experiment.

The specific reduced viscosity (RV) and the specific sum total A of the aromatic polysulfone resin of the present invention can also be attained by mixing two or more kinds of aromatic polysulfone resins which have reduced viscosities (RV) and sum totals A different from each other. In this case, the reduced viscosity of the aromatic polysulfone resins to be mixed should be 0.45 dl/g or less. Methods for mixing in this case are not particularly limited and include, for example, mixing of powders to another powders, mixing utilizing a solution and the like.

The thermoplastic aromatic polysulfone resin of the present invention is preferably used as a particle having the average particle diameter of about 50 to 2,000 $\mu$m. When the diameter is less than 50 $\mu$m, insoluble matter tend to be formed due to the aggregation of the particles and the geling of the aggregated mass on preparing a solution, particularly a solution having a concentration of 20% by weight or more. When the diameter is more than 2,000 $\mu$m, the dissolution of the resin takes longer time. More preferred diameter range is 100 to 1,000 $\mu$m.

The thermoplastic aromatic polysulfone resin of the present invention is usually used as a solution of an organic solvent. Although the organic solvent used for preparing the solution is not particularly limited insofar as the solvent dissolves the resin, normally methylene chloride, 1,1,2-trichloroethane, N,N-dimethylformamide, 1-methyl-2-pyrrolidone, dimethylsulfoxide, pyridine, quinoline, aniline, o-chlorophenol, dimethylacetamide, diethylacetamide, anisol, $\gamma$-butyrolactone, dioxolane and the like are used as the organic solvent.

In the thermoplastic aromatic polysulfone resin of the present invention, the number of metallic salts of phenolic hydroxyl groups is preferably 25% or less of the sum total A of the number of phenolic hydroxyl groups and the number of metallic salts thereof contained in 100 repeating units of the polymer, for providing a solution of the resin of the present invention in an organic solvent having a lower viscosity.

The solvent can be used singly or in combination of two or more kinds of solvents. In order to prepare a coating having an excellent surface smoothness or a processing intermediate having excellent solution stability, it is preferred to use a mixture of two or more kinds of solvents. In this case, a solvent other than those exemplified above can be used insofar as the solubility of the thermoplastic aromatic polysulfone resin is adversely affected.

Methods for preparing the solution is an organic solvent is not particularly limited. For example, a solvent may be added to the resin or a resin may be added to a solvent.

When using the thermoplastic aromatic polysulfone resin of the present invention for preparing a coating, an adhesive, a composite material and the like, an additive can be added in order to provide them with various functions. Examples of such additive include dye, pigment, plasticizer, adsorbent for various rays, stabilizer and conductive material.

When the thermoplastic aromatic polysulfone resin of the present invention is used for a coating, an adhesive, a composite material or the like, a heat treatment is usually conducted after coating a substrate, binding the substrate with another substrate, mixing with another substance or the like to effect the molecular weight-increase an inactivation. Method for the heat treatment is not particularly limited. It is decided in view of various properties such as mechanical property, optical property and the like of coating, adhesion and composite material to be produced, performance or economy of apparatus for use in processing and the like.

Although temperature of the heating is not particularly limited and decided according to the use and performance of the apparatus, generally, the temperature is between 250° C. and 450° C. In particular, a temperature between 300° C. and 400° C. is preferred because a product with suitable molecular weight is produced and a degradation reaction such as coloring is suppressed. A temperature lower than 250° C. is not preferred from the viewpoint of productivity because a longer time is requires for molecular weight-increase. A temperature higher than 450° C. is not preferred because the degradation reaction of the resin tends to occur and problems such as coloring tend to be caused.

Atmosphere of the heating is not particularly limited. The heating may be conducted in air or in the absence of oxygen. The treatment under presence of oxygen sometimes allows shortening of the treating period.

The thermoplastic aromatic polysulfone resin of the present invention allows the molecular weight-increase and the inactivation by a heat treatment under moderate conditions. When it is dissolved in a solvent, the formation of the insoluble matters which causes various defects can be avoided. Therefore, the resin of the present invention is advantageous as a material for use in coating, adhesion, composite material or the like.

EXAMPLES

The present invention will now be described in more detail with reference to Examples, which should not be construed as a limitation upon the scope of the invention.

Measurements and evaluations were performed according to the following methods:

(1) Determination of the sum total of the number of phenolic hydroxyl groups and the number of metallic salts thereof contained in 100 repeating units of the polymer:

A portion of the aromatic polysulfone resin was dissolved in dimethylformamide. An excess amount of p-toluenesulfonic acid was added. Using 0.5 mol/l potassium methoxide/toluene-methanol solution as a reagent for titration, amounts of the residual p-toluenesulfonic acid and hydroxyl group were determined by a potentiometric titration apparatus. The number of metallic salt of phenolic hydroxyl groups and the total number of phenolic hydroxyl groups and metallic salts thereof were calculated from the obtained value and an average molecular weight of the repeating unit in the aromatic polysulfone resin. Further, the number of phenolic hydroxyl groups, and a ratio of the number of metallic salt of the phenolic hydroxyl group to the sum total of the number of phenolic hydroxyl group and the number of metallic salts salt thereof were calculated from these results.

(2) Observation of insoluble matter:

In to a 100 ml-sample bottle was placed 30 ml of a 1-methyl-2-pyrrolidone solution containing 30% by weight of an aromatic polysulfone resin using a measuring cylinder and insoluble matter was visually observed.

(3) Measurement by GPC:

GPC system HLC 8020, manufactured by Tohso, was used as an apparatus, and TSK gel GMHHR-H, manufactured by Tohso, was used as the column. The relative molecular weight converted to polystyrene was obtained by measuring the polymer at a concentration of 0.5% by weight, a flow rate of 1 ml/minute and a column oven temperature of 40° C., with a UV detector (300 nm), using N,N-dimethylformamide containing 50 mmol/l lithium bromide monohydrate as a development solvent and an eluent.

Example 1

An aromatic polysulfone resin having a repeating unit represented by the formula (1) described above was prepared by the following process.

Into a polymerization vessel having a capacity of 2,000 ml and equipped with a stirrer, an introduction tube for nitrogen gas, a thermometer and a condenser having a container at the end were charged 525.0 g of 4,4'-dihydroxydiphenylsulfone, 590.55 g of 4,4'-dichlorodiphenylsulfone and 980.0 g of diphenylsulfone as a polymerization solvent. After the mixture was heated up to 180° C. while passing nitrogen gas through the vessel, 295.7 g of anhydrous potassium carbonate was added.

Then, the temperature was gradually elevated to 290° C. and the reaction was continued for 2 hours at the same temperature.

After the reaction was over, the reaction solution was cooled to room temperature. A solidified reaction mass was finely divided and washed with warm water to remove potassium chloride. Washing with a mixed solvent of acetone and methanol was carried out several times to remove diphenylsulfone used as a polymerization solvent. Then the product was washed with water and dried with heating at 150° C.

The divided resin had an average particle diameter of 500 μm. According to the potentiometric determination, the sum total A of the number of phenolic hydroxyl groups and the number of metallic salts thereof contained in 100 repeating units of the polymer was 2.6. The ratio of the number of metallic salt of the phenolic hydroxyl group to the sum total of the number of phenolic hydroxyl group and the number of metallic salts thereof was 27%. Measurement of reduced viscosity showed 0.44 dl/g.

A solution of 1-methyl-2-pyrrolidone containing 30% by weight of the obtained resin powder was prepared. Measurement of the solution viscosity showed 70 poise.

A 30 ml portion of this solution was randomly taken and observed visually. No insoluble matter was found indicating complete dissolution.

Into a 500 ml flask was placed 50 g of the obtained resin powder and 30 ml of methanol was added. The mixture was allowed to stand for 12 hours. Then, methanol was removed by filtration. The residue and 300 ml of water were placed in a 500 ml separable flask equipped with an anchor-type blade and stirred for 4 hours keeping pH at 3 to 5 by addition of acetic acid. Upon filtration and drying at 150° C. for 12 hours, an acid-treated resin powder was obtained.

The acid-treated resin powder had the sum total A of the number of phenolic hydroxyl groups and the number of metallic salts thereof contained in 100 repeating units of the polymer of 2.8. The ratio of the number of metallic salt of the phenolic hydroxyl group to the sum total of the number of phenolic hydroxyl group and the number of metallic salts thereof was 18%. A solution in 1-methyl-2-pyrrolidone containing 30% by weight of the obtained resin powder was prepared. Measurement of solution viscosity showed 50 poise. A 30 ml portion of this solution was randomly taken and observed. No insoluble matter was found indicating complete dissolution.

Into 4 aluminum cups were placed 1.5 g portions, respectively, of the obtained resin powder (acid-untreated product), and dried at 200° C. for 6 hours. Then, they were transferred while hot into an electric furnace preheated to 350° C. and subjected to heat treatment in the air. The heating time was varied in 4 different conditions, i.e. 1 minute, 2 minutes, 8 minutes and 15 minutes.

Samples after heat treatment were cooled, removed from the aluminum cups and subjected to dissolving treatment by addition of 10 ml of dimethylformamide per 0.05 g of the resin. As the result, samples heated for 2 minutes or more (2 minutes, 8 minutes and 15 minutes) did not completely dissolve and existence of insoluble matter yielded by the molecular weight-increase by heat treatment was observed.

Similarly, into 4 aluminum cups were placed 1.5 g portions, respectively, of the obtained resin powder (acid-untreated product), and dried at 200° C. for 6 hours. Then, they were transferred while hot into an electric furnace preheated to 300° C. and subjected to heat treatment in the air. The heating time was varied in 5 different conditions, i.e. 5 minutes, 10 minutes, 15 minutes, 20 minutes and 30 minutes.

Samples after heat treatment were cooled, removed from the aluminum cup and subjected to dissolving treatment by addition of 10 ml of dimethylformamide per 0.05 g of the resin. As the result, samples heated for 20 minutes or more (20 minutes and 30 minutes) did not completely dissolve and existence of insoluble matter yielded by the molecular weight-increase by heat treatment was observed. Samples before and of 10-minutes heating were assayed for measurement of polystyrene-converted weight average molecular weight by GPC method. As the result, the value for the sample before heating was 47,000 and the value for the sample of 10-minutes heating was 52,100. The above results show that the heat treatment increases the molecular weight and yields insoluble matter.

A solution in 1-methyl-2-pyrrolidone containing 20% by weight of the obtained resin powder (acid-untreated product) was prepared. Onto a SUS 430-plate having a thickness of 2 mm, a size of 100 mm×100 mm and of 2B finish was coated 2 ml of this solution and subjected to drying treatment in an oven at 200° C. for 60 minutes.

After drying, the samples were transferred while hot into an electric furnace set at 350° C. and subjected to heat treatment. The heating time was varied in 3 different conditions, i.e. 2 minutes, 5 minutes and 10 minutes.

The samples were cooled and assayed for pencil hardness of the coated film formed on the SUS plates. The results showed that 2 minutes- and 5 minutes-treatment films correspond to HB and 10 minutes-film corresponded to F, indicating that the hardness of films increased with period of heating.

The coated films were removed from SUS plates and added to 10 ml of N,N-dimethylformamide (containing 50 mmol/l lithium bromide monohydrate) per 0.05 g of the resin to prepare solutions. As the result, the sample heated for 2 minutes was completely dissolved but those for 5 minutes and 10 minutes were not completely dissolved remaining insoluble matter.

All of the solutions of 0, 2, 5 and 10 minutes-treatment samples were filtered with a PTFE membrane filter having a pore diameter of 0.5 μm and subjected to GPC measurement. As the result, polystyrene-converted weight average molecular weight for the sample before heating was 48,200, that for the sample of 2-minutes heating was 56,500, that for the sample of 5-minutes heating was 99,300 and that for the sample of 10-minutes heating was 52,000.

Among samples heated on the SUS-plates, coated films of 5-minutes heating and 10-minutes heating samples, in which insoluble matter was found, were pealed and cut into a square of less than 2 mm×2 mm. About 0.5 g of the cut samples were exactly weighed and placed in 20 ml glass sample bottles. To this was added 10 ml of 1-methyl-2-pyrrolidone and the mixture was stirred with shaking (180 rpm) at room temperature for 15 hours to effect dissolution.

The sample-and-solution mixture after the dissolution treatment was filtered with pressure by a previously exactly weighed PTFE membrane filter having a pore diameter of 0.5 μm. The residue was sufficiently washed with 1-methyl-2-pyrrolidone.

Then the membrane filter with substance was dried under vacuum at 200° C. for 6 hours and weighed. The weight of the insoluble residue was determined by the difference between the obtained weight and the weight of the filter before the filtration treatment. The rate of insolubilization by heat treatment was calculated as a ratio of the weight of the insoluble residue and the weight of the sample subjected to dissolution treatment. The result showed 9% for 5-minutes heating and 80% for 10-minutes heating.

Comparative Example 1

The reduced viscosity of Sumika Excel PES 59003P, Lot No. SS 5016, manufactured by Sumitomo Chemical Co., Ltd., was measured, and it was 0.51 dl/g. The potentiometric titration of it showed that the sum total of the number of phenolic hydroxyl groups and the number of metallic salts thereof contained in 100 repeating units of the polymer was 2.0. The resin powder had an average particle diameter of 500 μm.

A solution in 1-methyl-2-pyrrolidine containing 30% by weight of this resin was prepared. The solution viscosity of this solution was measured and it was 160 poise. A 30 ml portion of this solution was randomly taken and observed. As the result, 7 gel-like insoluble matters were observed. Onto a SUS-plate having a thickness of 2 mm, a size of 100 mm×100 mm and of 2B finish was coated 2 ml of this solution and dried in a short time. Fish eye-defects were formed and it was found that they were formed around the gel-like insoluble matters acting as nuclei.

According to the same manner as in Example 1, the resin powder was subjected to the heat treatment in an electric furnace preheated to 350° C. and then subjected to the dissolving treatment. As the result, samples heated for 2 minutes or more (2 minutes, 8 minutes and 15 minutes) did not completely dissolve and existence of insoluble matter yielded by the molecular weight-increase by heat treatment was observed.

Next, according to the same manner as in Example 1, the resin powder was subjected to the heat treatment in an electric furnace preheated to 300° C. and then subjected to the dissolving treatment. As the result, samples heated for 20 minutes or more (20 minutes and 30 minutes) did not completely dissolve and existence of insoluble matter yielded by the molecular weight-increase by heat treatment was observed. Samples before and of 10-minutes heating were assayed for measurement of polystyrene-converted weight average molecular weight by GPC method. As the result, the value for the sample before heating was 60,500 and the value for the sample of 10-minutes heating was 93,600.

Further, according to the same manner as in Example 1, a solution in 1-methyl-2-pyrrolidone containing 20% by weight of the resin powder was coated onto a SUS-plate and subjected to the drying treatment. Then, the samples were subjected to the heat treatment in an electric furnace set at 350° C. The coated films formed on SUS-plates were removed and subjected to the dissolving treatment. As the result, samples heated for 2 minutes was completely dissolved but those for 5 minutes and 10 minutes were not completely dissolved remaining insoluble matter yielded by the molecular weight-increase by heat treatment.

Still further, according to the same manner as in Example 1, the coated films formed on SUS-plates of 5-minutes heating and 10-minutes heating samples, in which insoluble matter was found, were subjected to dissolving treatment and the rate of insolubilization by heat treatment was calculated. The result showed 32% for 5-minutes heating and 89% for 10-minutes heating.

Comparative Example 2

The reduced viscosity of Sumika Excel PES 4100P, Lot No. SB 5032, manufactured by Sumitomo Chemical Co., Ltd., was measured, and it was 0.41 dl/g. According to the potentiometric titration, no phenolic hydroxyl groups and the metallic salts thereof were detected. The resin powder had an average particle diameter of 500 μm.

A solution of 1-methyl-2-pyrrolidone containing 30% by weight of this resin was prepared. The solution viscosity of this solution was measured and it was 70 poise. A 30 ml portion of this solution was randomly taken and observed. As the result, no insoluble matter was found indicating complete dissolution.

According to the same manner as in Example 1, the resin powder was subjected to the heat treatment in an electric furnace preheated to 350° C. and then subjected to the dissolving treatment. As the results, samples heated for 2 minutes and 8 minutes completely dissolved and existence of insoluble matter yielded by the molecular weight-increase by heat treatment was not observed in the samples heated for 2 minutes and 8 minutes.

Next, according to the same manner as in Example 1, the resin powder was subjected to the heat treatment in an electric furnace preheated to 300° C. and then subjected to the dissolving treatment. As the result, all samples completely dissolved. That is, the molecular weight-increase effect by heat treatment was not observed. Samples before and of 30-minutes heating were assayed for measurement of polystyrene-converted weight average molecular weight by GPC method. As the result, the value for the sample before heating was 73,800 and the value for the sample of 30-minutes heating was 73,200. That is, no molecular weight-increase was observed.

Further, according to the same manner as in Example 1, a solution in 1-methyl-2-pyrrolidone containing the resin powder was coated onto a SUS-plate and subjected to the drying treatment. Then, the samples were subjected to the heat treatment in an electric furnace set at 350° C.

The samples were cooled and assayed for pencil hardness of the coated film formed on the SUS plates. The results showed that 2 minutes- and 5 minutes-treatment films correspond to B and 10 minutes-film correspond to HB. Although the results indicate that the hardness of films increased with period of heating, the degrees of increase are lower than those of Example 1.

Then, the coated films formed on SUS-plates were removed and subjected to the dissolving treatment. As the result, samples heated for 2 minutes was completely dissolved but those for 5 minutes and 10 minutes were not completely dissolved remaining insoluble matter yielded by the molecular weight-increase by heat treatment.

Still further, according to the same manner as in Example 1, the coated film formed on SUS-plates of 5-minutes heating and 10-minutes heating samples, in which insoluble matter was found, were subjected to dissolving treatment and the rate of insolubilization by heat treatment was calculated. The result showed 2% for 5-minutes heating and 22% for 10-minutes heating.

Example 2

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 422.2 g, 497.5 g, 784.0 g and 239.0 g, respectively, to give an aromatic polysulfone resin powder.

The resin powder thus obtained had an average particle diameter of 500 μm. According to the potentiometric determination, the sum total of the number of phenolic hydroxyl groups and the number of alkali metal salts thereof contained in 100 repeating units of the polymer was 2.15. Measuring of reduced viscosity showed 0.40 dl/g.

A solution in 1-methyl-2-pyrrolidone containing 30% by weight of the obtained resin powder was prepared. Measurement of solution viscosity showed 60 poise.

A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes or more (2 minutes, 8 minutes and 15 minutes) did not completely dissolve and existence of insoluble matter yielded by the molecular weight-increase by heat treatment was observed.

Next, according to Example 1, the resin powder was subjected to the heat treatment in an electric furnace preheated to 300° C. and then subjected to the dissolving treatment. As the result, samples heated for 20 minutes or more (20 minutes and 30 minutes) did not completely dissolve and existence of insoluble matter yielded by the molecular weight-increase by heat treatment was observed.

Example 3

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 422.2 g, 481.0 g, 784.0 g and 236.6 g, respectively, to give an aromatic polysulfone resin powder.

The resin powder thus obtained had an average particle diameter of 500 μm. According to the potentiometric determination, the sum total of the number of phenolic hydroxyl groups and the number of alkali metal salts thereof contained in 100 repeating units of the polymer was 2.0. Measurement of reduced viscosity showed 0.45 dl/g.

A solution in 1-methyl-2-pyrrolidone containing 30% by weight of the obtained resin powder was prepared.

A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes or more (2 minutes, 8 minutes and 15 minutes) did not completely dissolve and existence of insoluble matter yielded by the molecular weight-increase by heat treatment was observed.

Next, according to Example 1, the resin powder was subjected to the heat treatment in an electric furnace preheated to 300° C. and then subjected to the dissolving treatment. As the result, samples heated for 20 minutes or more (20 minutes and 30 minutes) did not completely dissolve and existence of insoluble matter yielded by the molecular weight-increase by heat treatment was observed.

Comparative Example 3

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 422.2 g, 479.5 g, 784.0 g and 237.8 g, respectively, and the reaction time at 290° C. was changed to 4 hours to give an aromatic polysulfone resin powder.

The resin powder thus obtained had an average particle diameter of 500 μm. According to the potentiometric determination, the sum total of the number of phenolic hydroxyl groups and the number of alkali metal salts thereof contained in 100 repeating units of the polymer was 2.19. Measurement of reduced viscosity showed 0.48 dl/g.

A solution in 1-methyl-2-pyrrolidone containing 30% by weight of the obtained resin powder was prepared.

A 30 ml portion of this solution was randomly taken and observed. As the result, 3 gel-like insoluble matters were observed.

Comparative Example 4

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 525.0 g, 590.6 g, 980.0 g and 295.7 g, respectively, to give an aromatic polysulfone resin powder.

According to the potentiometric determination, the sum total of the number of phenolic hydroxyl groups and the number of alkali metal salts thereof contained in 100 repeating units of the polymer was 3.6. Measurement of reduced viscosity showed 0.34 dl/g.

A solution in 1-methyl-2-pyrrolidone containing 30% by weight of the obtained resin powder was prepared.

A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 8 minutes or more (8 minutes and 15 minutes) did not completely dissolve. However, samples heated for 2 minutes completely dissolved and existence of insoluble matter yielded by the molecular weight-increase by heat treatment was not observed in the samples heated for 2 minutes.

Next, according to Example 1, the resin powder was subjected to the heat treatment in an electric furnace preheated to 300° C. and then subjected to the dissolving treatment. As the result, samples heated for 30 minutes or more did not completely dissolve. However, samples heated for 20 minutes or shorter completely dissolved and existence of insoluble matter yielded by the molecular weight-increase by heat treatment was not observed in the samples heated for 20 minutes or shorter.

Comparative Example 5

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 105.01 g, 119.28 g, 196.00 g and 57.12 g, respectively, to give an aromatic polysulfone resin powder.

According to the potentiometric determination, the sum total of the number of phenolic hydroxyl groups and the number of alkali metal salts thereof contained in 100 repeating units of the polymer was 2.47. Measurement of reduced viscosity showed 0.33 dl/g.

A solution in 1-methyl-2-pyrrolidone containing 30% by weight of the obtained resin powder was prepared.

A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes completely dissolved and existence of insoluble matter yielded by the molecular weight-increase by heat treatment was not observed.

Example 4

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 105.01 g, 119.28 g, 196.00 g and 57.41 g, respectively, to give an aromatic polysulfone resin powder.

According to the potentiometric determination, the sum total of the number of phenolic hydroxyl groups and the number of alkali metal salts thereof contained in 100 repeating units of the polymer was 2.04. Measurement of reduced viscosity showed 0.39 dl/g.

A solution of 1-methyl-2-pyrrolidone containing 30% by weight of the obtained resin powder was prepared.

A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes did not completely dissolve and existence of insoluble matter yielded by the molecular weight-increase by heat treatment was observed.

Example 5

An aromatic polysulfone resin having a repeating unit represented by the formula (1) described above was prepared by the following process.

The same procedure as in Example 1 was substantially repeated except that the amount of 4,4'-dihydroxydiphenylsulfone, 4,4'-dichlorodiphenylsulfone, diphenylsulfone as a polymerization solvent and anhydrous potassium carbonate were changed to 104.48 g, 119.28 g, 196.00 g and 59.43 g, respectively, to give an aromatic polysulfone resin powder.

According to the potentiometric determination, the sum total of the number of phenolic hydroxyl groups and the number of alkali metal salts thereof contained in 100 repeating units of the polymer was 1.63. Measurement of reduced viscosity showed 0.45 dl/g.

A solution in 1-methyl-2-pyrrolidone containing 30% by weight of the obtained resin powder was prepared.

A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes did not completely dissolve and existence of insoluble matter yielded by the molecular weight-increase by heat treatment was observed.

Comparative Example 6

The powdery aromatic polysulfone resin obtained in Comparative example 5 and Sumika Excel PES 4100P, Lot No. SB 5032, manufactured by Sumitomo Chemical Co., Ltd., used in Comparative Example 2 were mixed in a weight ratio of 1:1 to give a powdery aromatic polysulfone resin having a sum total of the number of phenolic hydroxyl groups and the number of alkali metal salts thereof contained in 100 repeating units of the polymer of 1.24. Measurement of reduced viscosity showed 0.38 dl/g.

A solution in 1-methyl-2-pyrrolidone containing 30% by weight of the obtained resin powder was prepared. A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, a 2-minutes heat treatment sample completely dissolved and existence of insoluble matter yielded by the molecular weight-increase by heat treatment was not observed.

Comparative Example 7

The powdery aromatic polysulfone resin obtained in Example 2 and Sumika Excel PES 4100P, Lot No. SB 5032, manufactured by Sumitomo Chemical Co., Ltd., used in Comparative Example 2 were mixed in a weight ratio of 1:1 to give a powdery aromatic polysulfone resin having a sum total of the number of phenolic hydroxyl groups and the number of alkali metal salts thereof contained in 100 repeating units of the polymer of 1.08. Measurement of reduced viscosity showed 0.41 dl/g.

A solution in 1-methyl-2-pyrrolidone containing 30% by weight of the obtained resin powder was prepared. A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes completely dissolved and existence of insoluble matter yielded by the molecular weight-increase by heat treatment was not observed.

Comparative Example 8

The powdery aromatic polysulfone resin obtained in Example 4 and Sumika Excel PES 4100P, Lot No. SB 5032, manufactured by Sumitomo Chemical Co., Ltd., used in Comparative Example 2 were mixed in a weight ratio of 1:1 to give a powdery aromatic polysulfone resin having a sum total of the number of phenolic hydroxyl groups and the number of alkali metal salts thereof contained in 100 repeating units of the polymer of 1.02. Measurement of reduced viscosity showed 0.41 dl/g.

A solution in 1-methyl-2-pyrrolidone containing 30% by weight of the obtained resin powder was prepared. A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes completely dissolved and existence of insoluble matter yielded by the molecular weight-increase by heat treatment was not observed.

Example 6

The powdery aromatic polysulfone resin obtained in Example 2 and the powdery aromatic polysulfone resin obtained in Comparative example 5 were mixed in a weight ratio of 1:1 to give a powdery aromatic polysulfone resin having a sum total of the number of phenolic hydroxyl groups and the number of alkali metal salts thereof contained in 100 repeating units of the polymer of 2.31. Measurement of reduced viscosity showed 0.36 dl/g.

A solution of 1-methyl-2-pyrrolidone containing 30% by weight of the obtained resin powder was prepared. A 30 ml portion of this solution was randomly taken and observed. No insoluble matter was found indicating complete dissolution.

According to the same manner as in Example 1, the resin powder was subjected to the heat treatment in an electric furnace preheated to 350° C. and then subjected to the dissolving treatment. As the result, samples heated for 2 minutes did not completely dissolve and existence of insoluble matter yielded by the molecular weight-increase by heat treatment was observed.

What is claimed is:

1. A thermoplastic aromatic polysulfone resin which has a reduced viscosity (RV) of 0.36 to 0.45 dl/g and a sum total A of the number of phenolic hydroxyl groups and the number of metallic salts thereof contained in 100 repeating units of the polymer of 1.6 or more, and wherein the repeating unit of the resin is represented by the following formula (1) or (2):

(—Ph—SO$_2$—Ph—O—)    (1)

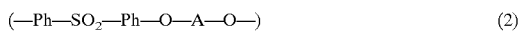

(—Ph—SO$_2$—Ph—O—A—O—)    (2)

wherein Ph represents a para-phenylene group and A represents a group of the formula (3):

—Ph'—(—B—Ph'—)m—    (3)

wherein Ph' represents a phenylene group, B represents a direct bond, an alkylene group having 1 to 3 carbon atoms, an oxygen atom or a sulfur atom, and m represents an integer of 1 to 3.

2. A thermoplastic aromatic polysulfone resin according to claim 1, which particle has the average particle diameter of about 50 to 2,000 μm.

3. A thermoplastic aromatic polysulfone resin according to claim 1, wherein the number of metallic salts of phenolic hydroxyl groups is preferably 25% or less of the sum total A of the number of phenolic hydroxyl groups and the number of metallic salts thereof contained in 100 repeating units of the polymer.

* * * * *